(12) United States Patent  (10) Patent No.: US 6,585,425 B2
Iwamoto  (45) Date of Patent: Jul. 1, 2003

(54) OPTICAL CIRCUIT ASSEMBLY FOR FACILITATING CONNECTION OF OPTICAL ADAPTER AND OPTICAL FIBER CABLE AND REDUCING PROTRUSION OF OPTICAL FIBER CABLE

(75) Inventor: Kentaro Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 09/950,705

(22) Filed: Sep. 13, 2001

(65) Prior Publication Data

US 2002/0031312 A1 Mar. 14, 2002

(30) Foreign Application Priority Data

Sep. 14, 2000 (JP) .................................... 2000/279351

(51) Int. Cl.[7] .................................................. F21V 8/00
(52) U.S. Cl. .............................. 385/88; 385/89; 385/90; 385/25
(58) Field of Search .................. 385/88, 89, 90, 385/25, 58–60, 135, 136, 137, 78, 86, 55, 92, 75

(56) References Cited

U.S. PATENT DOCUMENTS

| | | | | |
|---|---|---|---|---|
| 5,317,485 A | * | 5/1994 | Merjanian | 362/574 |
| 5,598,495 A | * | 1/1997 | Rittle et al. | 385/75 |
| 5,642,450 A | * | 6/1997 | Oda | 385/60 |
| 5,708,745 A | * | 1/1998 | Yamaji et al. | 385/92 |
| 5,887,098 A | * | 3/1999 | Ernst et al. | 385/55 |
| 6,361,218 B1 | * | 3/2002 | Matasek et al. | 385/60 |

FOREIGN PATENT DOCUMENTS

| | | |
|---|---|---|
| JP | 2-78903 | 6/1990 |
| JP | 5-249345 | 9/1993 |
| JP | 2505865 | 4/1996 |
| JP | 9-178998 | 7/1997 |
| JP | 2891925 | 2/1999 |
| JP | 2988203 | 10/1999 |

\* cited by examiner

*Primary Examiner*—Mohammad Sikder
(74) *Attorney, Agent, or Firm*—McGinn & Gibb, PLLC

(57) ABSTRACT

An optical circuit assembly is composed of a board for mounting an optical circuit element, an optical adapter that connects an optical fiber cable to the optical circuit element, and an adapter supporting member which movably supports the optical adapter. The adapter supporting member allows the optical adapter to move between first and second positions. The first position is located substantially at an edge of the board, and the second position is located above the board away from the edge.

15 Claims, 15 Drawing Sheets

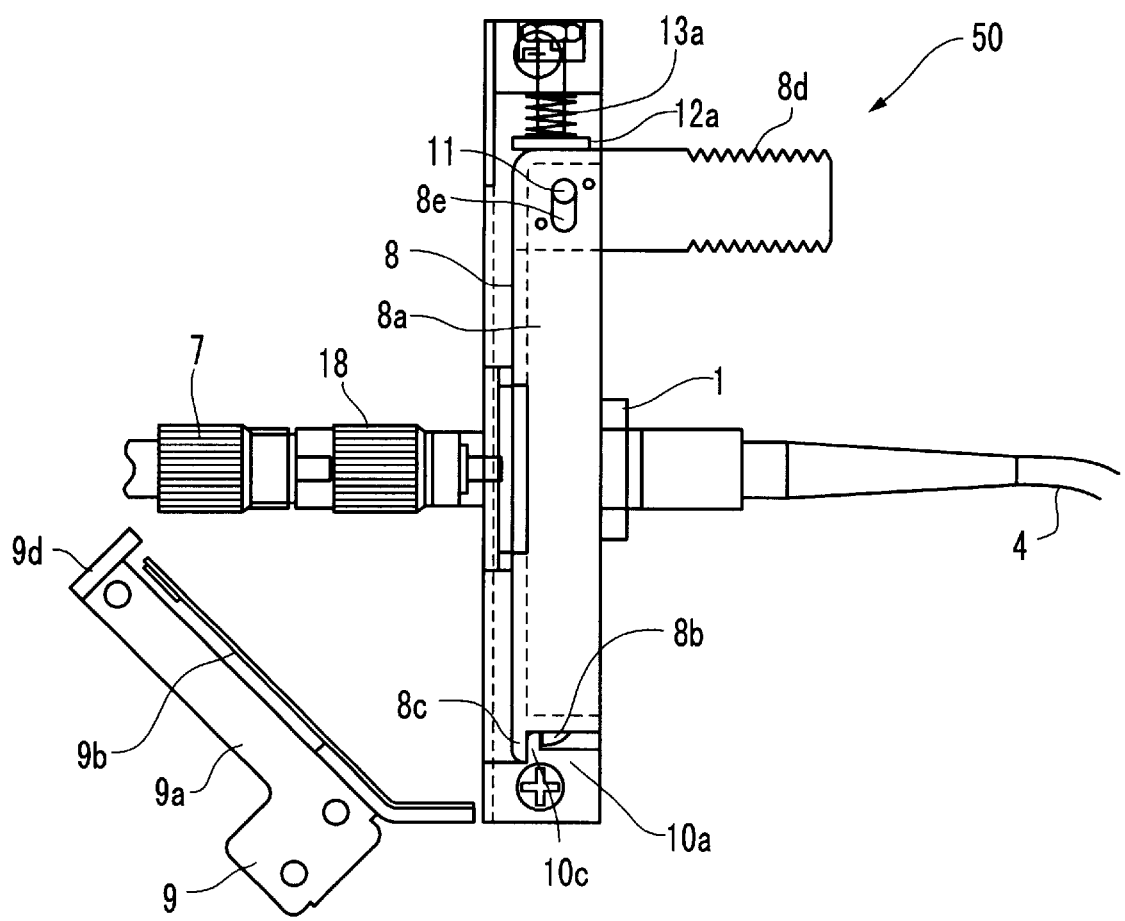

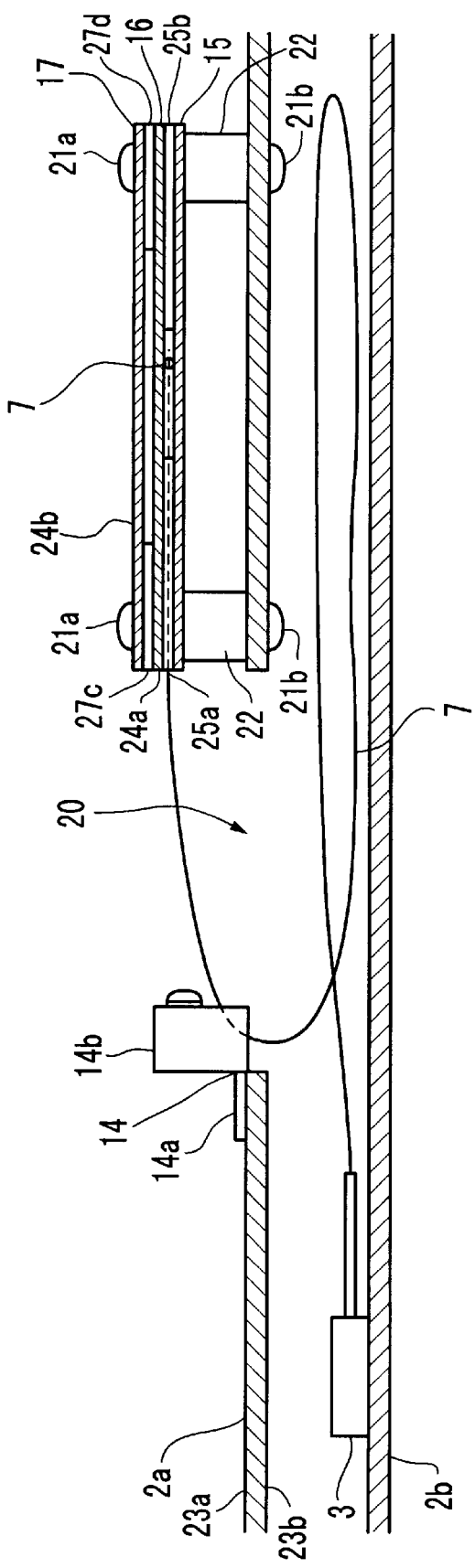

OPTICAL CIRCUIT ASSEMBLY FOR FACILITATING CONNECTION OF OPTICAL ADAPTER AND OPTICAL FIBER CABLE AND REDUCING PROTRUSION OF OPTICAL FIBER CABLE

BACKGROUND OF THE INVENTION

1. Field of the Invention

The present invention relates to an optical circuit assembly. More particularly, the present invention relates to an optical circuit assembly provided with an optical adapter to connect an optical module to an optical fiber.

2. Description of the Related Art

Optical adapters are used for connecting optical fibers to optical modules. Various structures are proposed for facilitating the connection of an optical adapter and an optical fiber.

Japanese Laid Open Patent Application (Jp-A-Heisei 5-249345) discloses a print circuit unit provided with optical adapters. As shown in FIG. 1, a print circuit board 101 is provided with an optical adapter 102. The optical adapter 102 is coupled to an optical fiber cable 103. The optical adapter 102 is coupled to the printed circuit board 101 by a fixture 104. As shown in FIG. 2, the fixture 104 includes a fixing board 105 coupled to the optical adapter 102, and a base 106 coupled to the printed circuit board 101. The fixing board 105 swings in the direction perpendicular to the print circuit board 101 on the axis 107. The swing of the fixing board 105 allows the optical adapter 102 and the printed circuit board 101 apart, and facilitates the connection of the optical adapter 102 and the optical fiber cable 103.

Japanese Laid Open Utility Model Application (JU-A-Heisei 2-78903) discloses another optical adapter installation structure. A plurality of fixing members are provided in the structure, each of which is coupled to an optical adapter. When an operator connects optical fiber cables to the optical adapters, the fixing members are separately rotated toward the operator. The rotation of fixing members facilitates the connection by the operator.

Other optical adapter installation structures are disclosed in Japanese Patent Office Gazette (Jp-B 2505865 and Jp-B 2988203). In these structures, an optical adapter is coupled to a printed circuit board by a fixture. The fixture allows the optical adapter to be drawn outside the printed circuit board, and facilitates the connection of the optical adapter to an optical fiber cable.

Also, still another optical adapter installation structure is disclosed in Japanese Laid Open Patent Application (Jp-A-Heisei 9-178998). In this structure, an optical adapter is installed in a tray. The tray is rotatably fixed on an axis. The tray is rotated to be drawn out of a housing to facilitate the connection of the optical adapter to an optical fiber cable.

Yet still another optical adapter mounting structure is disclosed in Japanese Patent Office Gazette (Jp-B 2891925). In the structure, optical adapters are fixed to a board having a notch. The optical adapters are located besides the notch. The notch provides a space for connection of optical fibers to the optical adapters, which facilitates the connection.

When an optical adapter is provided on a board, the optical adapter is preferably close to the edge of the board for facilitating the connection of an optical adapter and an optical fiber cable. However, this enlarges protrusion of the optical fiber cable from the edge of the board.

If the optical adapter is fixed away from the edge of the board, the protrusion of the optical fiber cable from the edge of the board is reduced. However, the easiness of the handle of the optical fiber cable and the optical adapter is also reduced.

SUMMARY OF THE INVENTION

Therefore, an object of the present invention is to provide an optical adapter mounting structure for reducing protrusion of the optical fiber from an edge of a board on which optical adapter is mounted.

Another object of the present invention is to provide an optical adapter mounting structure for facilitating connection of an optical adapter and an optical fiber cable.

Still another object of the present invention is to provide an optical adapter mount structure for reducing vibration of an inner optical fiber cable provided above a board.

In order to achieve an aspect of the present invention, an optical circuit assembly is composed of a board for mounting an optical circuit element, an optical adapter that connects an optical fiber cable to the optical circuit element, and an adapter supporting member which movably supports the optical adapter. The adapter supporting member allows the optical adapter to move between first and second positions. The first position is located substantially at an edge of the board, and the second position is located above the board away from the edge.

The adapter supporting member preferably includes a grip for handling by an operator to move the optical adapter.

The adapter supporting member preferably includes a first fixing member which locks the optical adapter to the first position.

In this case, it is preferable that the adapter supporting member preferably further includes a grip for handling by an operator to move the optical adapter, and the first fixing member releases the optical adapter from the first position by the handling.

The adapter supporting member preferably includes a second fixing member which locks the optical adapter to the second position.

In this case, it is preferable that the adapter supporting member further includes a grip for handling by an operator to move the optical adapter, and the second fixing member releases the optical adapter from the second position by the handling.

Preferably, the adapter supporting member further includes a sliding piece, and the second fixing member releases the optical adapter from the second position in response to sliding of the sliding piece.

The sliding piece is preferably located substantially at the edge.

The adapter supporting member preferably includes a swinging bar coupled to the optical adapter, and an axis which is connected to one of ends of the swinging bar to allow the supporting bar to swing on the axis.

The adapter supporting member preferably includes an adapter carrier coupled to the optical adapter, an adapter guide member slidingly connected to the adapter carrier to guide the adapter carrier such that the optical adapter moves between the first and second positions.

The optical circuit assembly may be further composed of an optical fiber guide member connected on the board. In this case, the optical circuit element includes an inner optical fiber cable coupled to the optical adapter, and the optical fiber guide member guides the inner optical fiber cable to move substantially in an plane.

In this case, the optical fiber guide member is preferably composed of first and second planar boards, and the inner optical fiber cable passed between the first and second planar boards.

The optical circuit assembly may be further composed of a fiber supporting member connected on the board, and the optical circuit element may includes an optical device, and an inner optical fiber cable connected between the optical device and the optical adapter. Also, the adapter supporting member may be provided on a first side of the board, and the optical device may be provided on a second side of the board opposite to the first side, and the board may be provided with a hole between the first and second side. In this case, the fiber supporting member preferably supports the inner optical fiber cable such that the inner optical fiber cable passes through the hole.

The fiber supporting member preferably includes a tube surrounding the inner optical fiber cable to protect the inner optical fiber cable.

The fiber supporting member preferably supports the inner optical fiber cable such that a first portion of the inner optical fiber cable located on the first side moves by a movement of the optical adapter while a second portion of the inner optical fiber cable located on the second side stays substantially in the same place.

BRIEF DESCRIPTION OF THE DRAWINGS

FIG. 6 shows the rotating mechanism 50 with a lock lever 8 locked by a guide piece 10;

FIG. 10 shows a fiber holder 14 and plates 15, 16, and 17;

DESCRIPTION OF THE PREFERRED EMBODIMENTS

Embodiments of an optical circuit assembly according to the present invention will be described below with reference to the attached drawings.

First Embodiment

Figure 1:
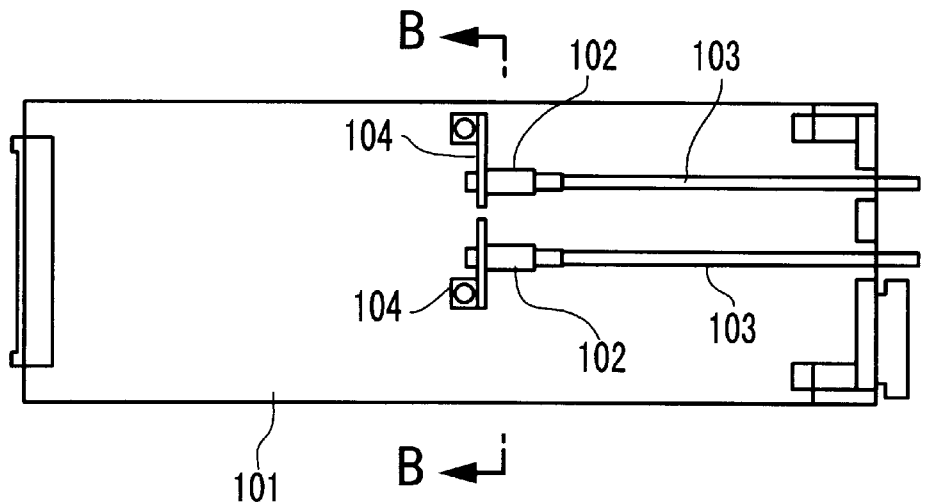
FIG. 1 shows a conventional optical adapter mounting structure.
Figure 2:
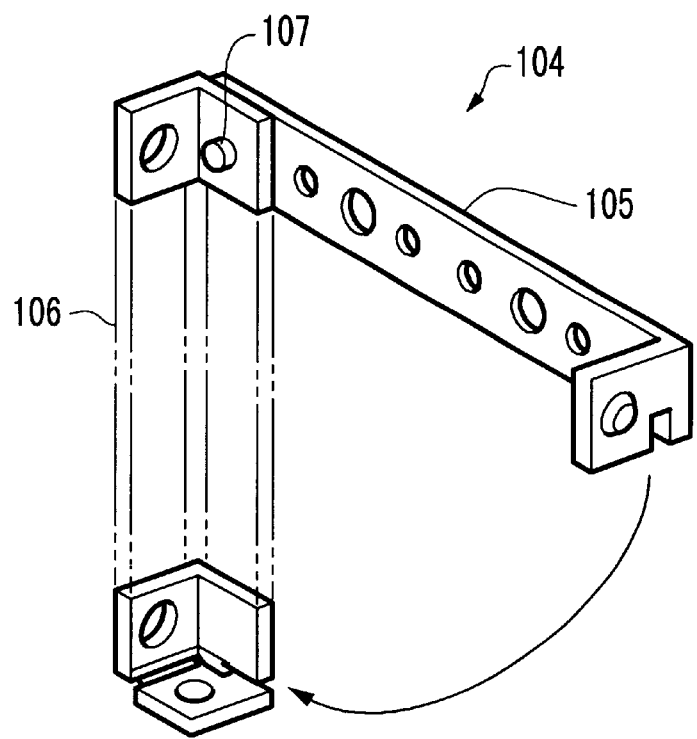
FIG. 2 shows the fixture 104 of the conventional optical adapter mounting structure.
Figure 3:
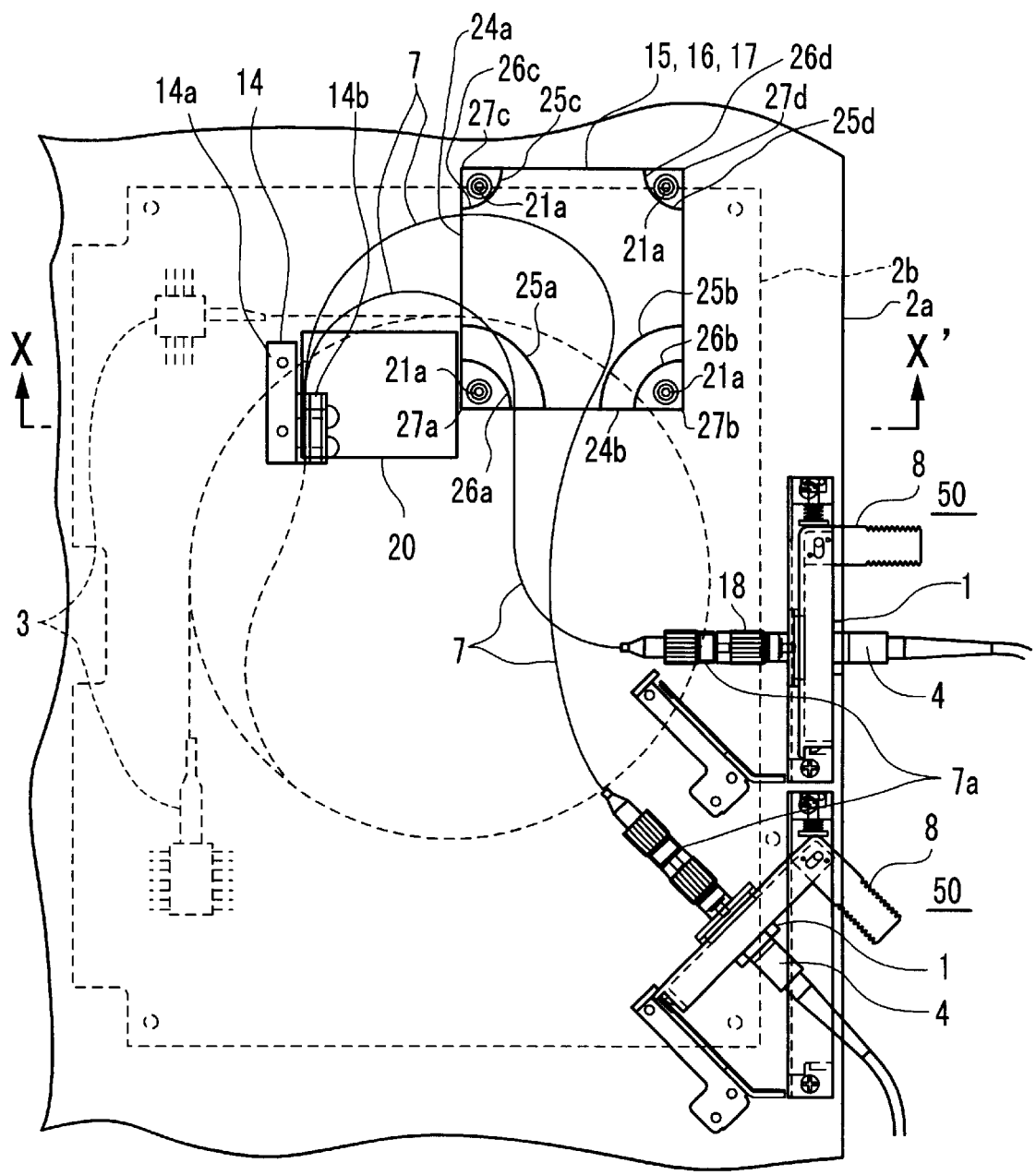
FIG. 3 shows a first embodiment of the optical circuit assembly according to the present invention.

In a first embodiment of the optical circuit assembly according to the present invention, a mother board is provided with optical adapters. As shown in FIG. 3, the optical adapters 1 are coupled to the mother board 2a. The optical adapters 1 are connected to optical fiber cables 4 for transfer optical signals between the optical circuit assembly and another optical processing unit.

A daughter board 2b is coupled to the mother board 2a on the opposite side to the optical adapters 1. Optical modules 3 are provided on the daughter board 2b for optical and electronic processing. The mother board 2a has an aperture 20, and the optical modules 3 are connected to the optical adapters 1 by inner optical fiber cables 7 passing through the aperture 20. Attenuators 18 are inserted between the optical adapters 1 and the inner optical fiber cables 7 to attenuate optical signals.

The optical adapters 1 are connected to the mother board 2a by rotating mechanisms 50. The rotating mechanisms 50 are screwed onto the mother board 2 to rotatably support the optical adapters 1.

Figure 4:
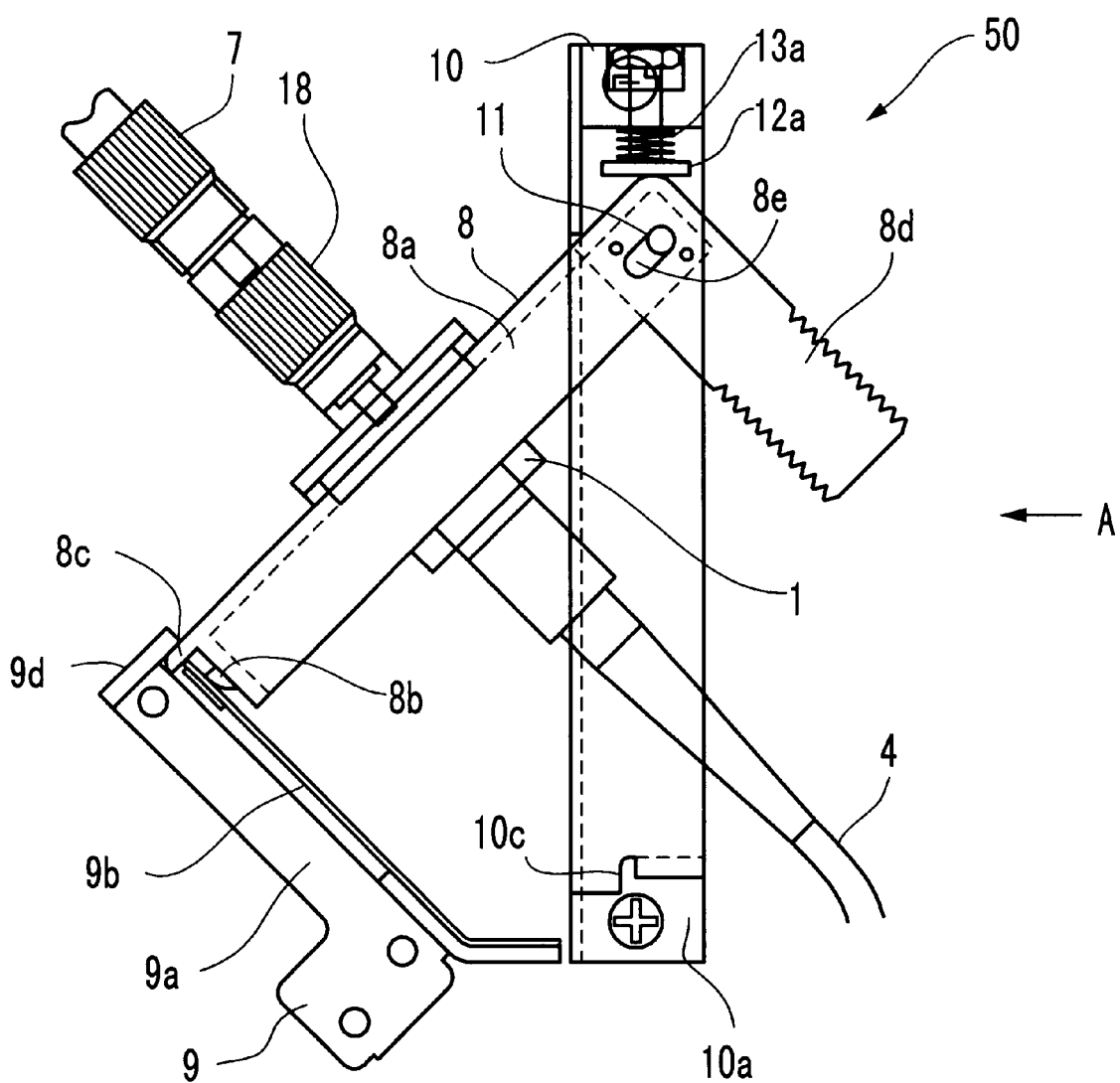
FIG. 4 shows a rotating mechanism 50.

FIG. 4 shows rotating mechanisms 50. Each of the rotating mechanisms 50 includes a lock lever 8, lock plate 9, a guide piece 10 and a spring pin 11. The lock lever 8 is coupled to the optical adapter 1. The lock lever 8 is rotatably supported by the guide piece 10, and allowed to swing on the spring pin 11 in a direction parallel to the mother board 2a.

The lock lever 8 includes a swinging bar 8a, a protrusion 8b and a stopper 8c and a grip 8d. The swinging bar 8a has a hole (not shown) through which the optical adapter 1 is inserted in a direction vertical to the swinging bar 8a. The protrusion 8b and the stopper 8c are disposed at one end of the swinging bar 8a. Both of the protrusion 8b and the stopper 8c protrude in the direction in which the swinging bar 8a extends. The grip 8d is vertically connected to the other end of the swinging bar 8a. The grip 8d is used for handling of the optical adapter 1 by a user of the optical circuit assembly. A slit is preferably provided on the grip 8d for an easy pinch of the grip 8d.

The swinging bar 8a has a hole 8e through which the spring pin 11 is passed. The spring pin 11 is fixed to the guide piece 10, and the swinging bar 8a is rotatably supported by the guide piece 10 on the spring pin 11. The hole 8e has short and long axes orthogonal to each other. The long axis is parallel to the direction in which the swing bar 8a extends. The length of the long axis is longer than the protruding length of the protrusion 8b.

Figure 5A:
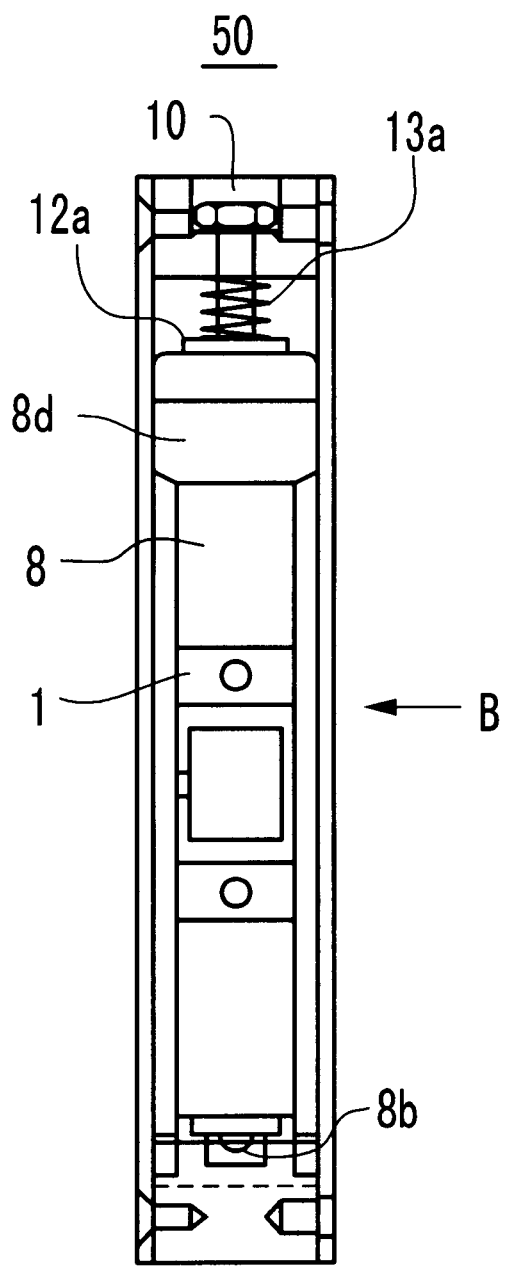
FIGS. 5A and 5B show the rotating mechanism 50.
Figure 5B:
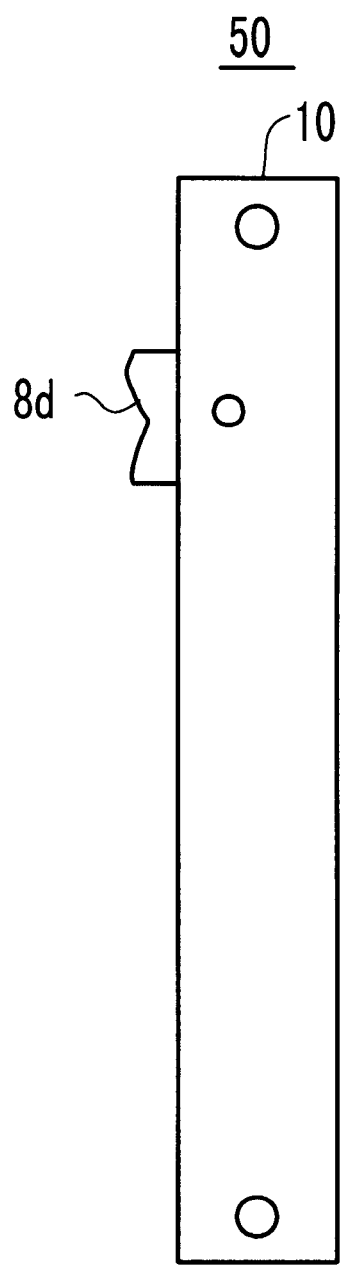

As shown in FIGS. 5A and 5B, the swinging bar 8a can be accommodated in the guide piece 10. As shown in FIG. 4, a block 10a is provided in the guide piece 10. A crow 10c is formed on the block 10a. In addition, a shaft 12a and a coil spring 13 are provided in the guide piece 10. The shaft 12 is passed through the coil spring 13. The coil spring 13 pushes the lock lever 8 toward the crow 10c.

The crow 10c is engaged to the protrusion 8b and the stopper 8c to lock the swinging bar 8a when the swinging bar 8a is accommodated in the guide piece 10. The coil spring 13 pushes the lock lever 8 toward the crow 10c to tightly fix the lock lever 8.

The swinging bar 8a can be locked by the lock plate 9 at an angle of 45 degrees to the guide piece 10. The lock plate 9 includes a plate body 9a, a plate spring 9b, and a wall 9d. The plate body 9a is screwed to the mother board 2a to be disposed at an angle of 45 degrees to the guide piece 10. The plate spring 9b is coupled to the plate body 9a. The plate spring 9b is allowed to swing beside the plate body 9a. One end of the plate body 9a away from the guide piece 10 is coupled to the wall 9d. The plate spring 9b and the wall 9d are engaged to the protrusion 8b to lock the swinging bar 8a at an angle of 45 degrees to the guide piece 10.

When the optical processing is executed by the optical module assembly, the optical adapters 1 and the optical fiber cables 4 are withdraw to reduce the protrusion of the optic fiber cables 4. The lock levers 8 are swung to withdraw the optical adapters 1 and the optical fiber cables 4. The operation of the rotating mechanism 50 for withdrawing the optical adapter 1 optic and fiber cables 4 is described below.

Figure 7:
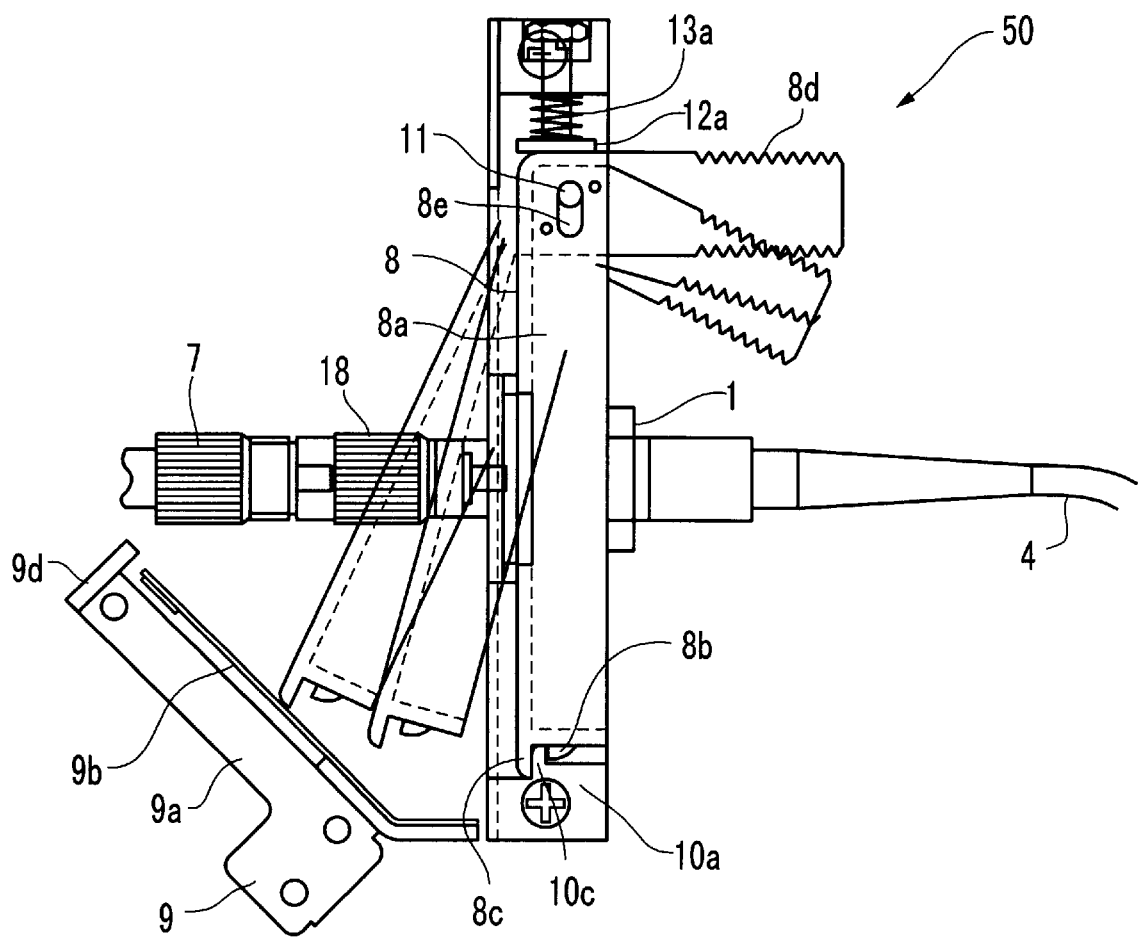
FIG. 7 shows the swing of the lock lever 8 for withdrawing an optical adapter 1 and an optical fiber cable 4.

Suppose that the swinging bar 8a is accommodated in the guide piece 10 as shown in FIG. 6. At this time, the optical adapter 1 is located substantially at the edge of the mother board 2a. An operator lifts up the lock lever 8 on the grip 8d against the pushing force of the coil spring 13a to release the swinging bar 8a from the crow 10c of the block 10a. The lifting of the lock lever 8 allows the swinging bar 8a to swing. Next, the user pushes the grip 8d in an obliquely downward direction to swing the lock lever 8 as shown in FIG. 7.

Figure 8:
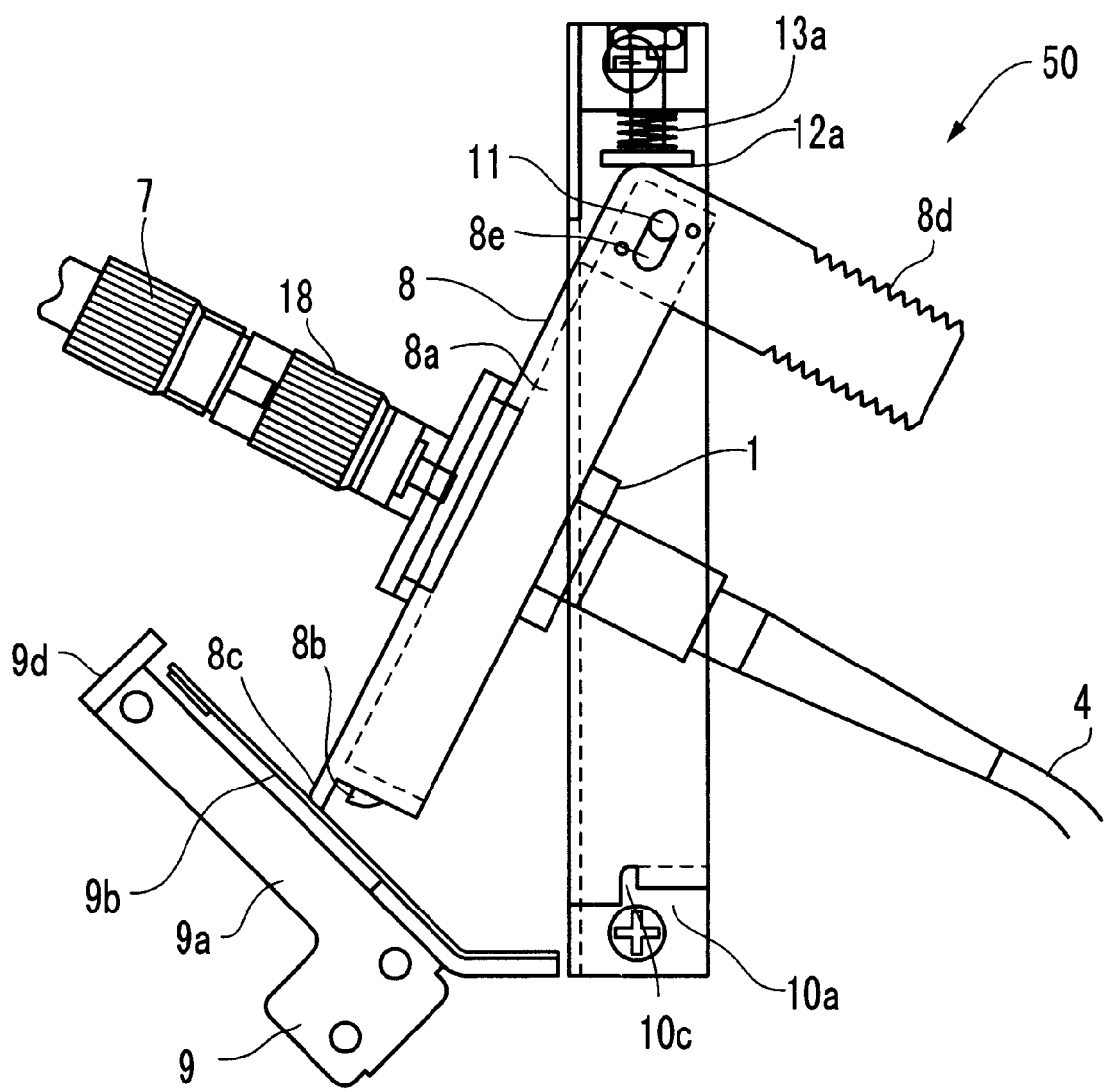
FIG. 8 shows the swing of the lock lever 8 for withdrawing the optical adapter 1 and the optical fiber cable 4.

As shown in FIG. 8, the swinging of the lock lever 8 by the operator deforms the plate spring 9b and contracts the coil spring 13. The deformed plate spring 9b returns back to the original state when the lock lever 8 is rotated at the angle of 45 degrees to the guide piece 10. Then, the plate spring 9b and the stopper 8c of the supporter 8a are engaged to lock the lock lever 8. The wall 9d of the lock plate 9 protects the lock lever 8 from being excessively rotated in the depth direction.

When the optical fiber cables 4 are connected or disconnected to the optical adapters 1, the optical adapters 1 are accommodated in the guide pieces 10 and placed at the edge of the mother board 2a. The operation of the rotating mechanism 50 for placing the optical adapter 1 at the edge of the mother board 2a is described below.

Figure 9:
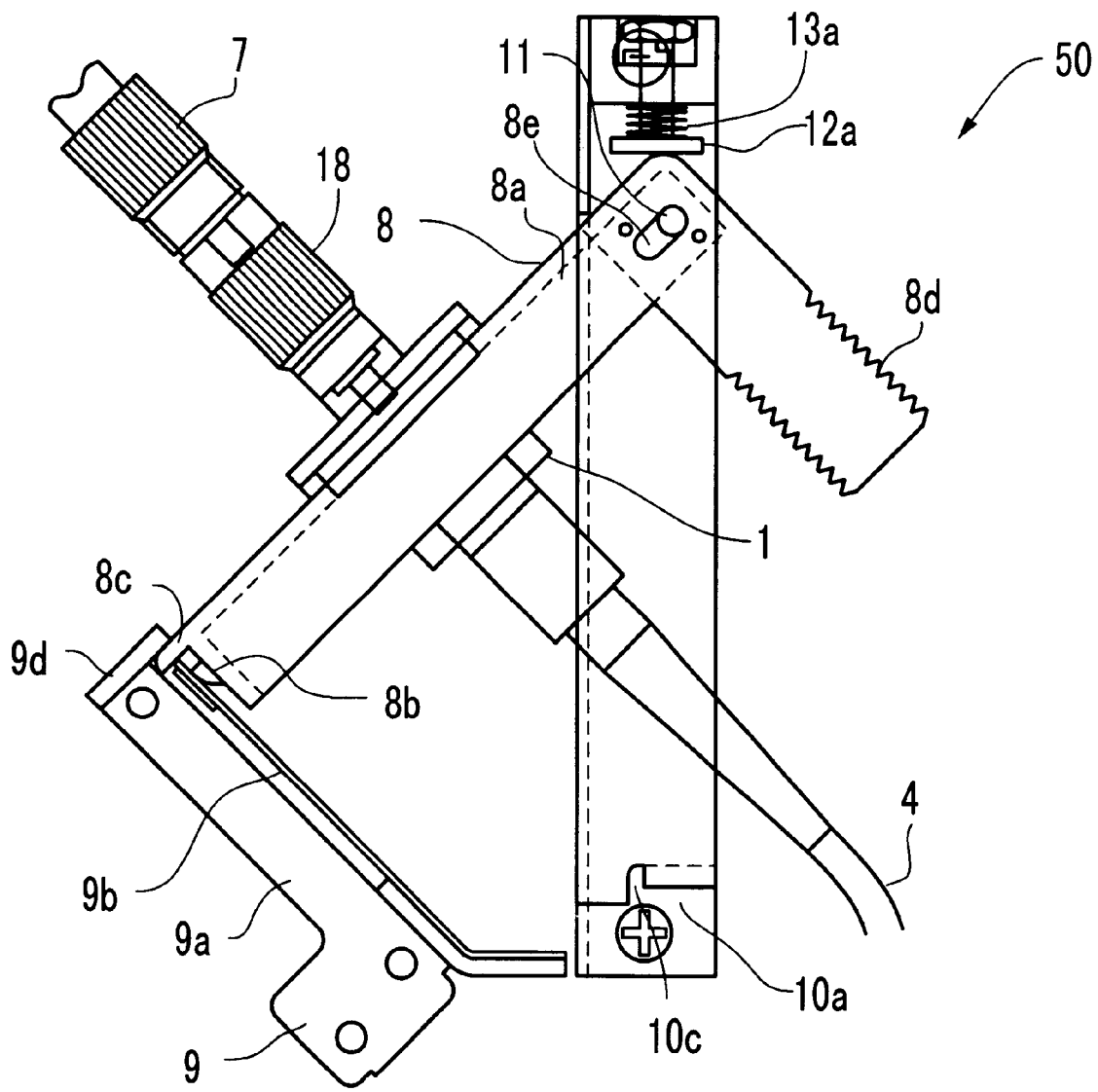
FIG. 9 shows the rotating mechanism 50 with the lock lever 8 locked by a lock plate 9.

Suppose that the lock lever 8 is engaged to the lock plate 9 as shown in FIG. 9. The operator picks up the grip 8d of the lock lever 8 and then lifts up the grip 8d against the pushing force in a direction vertical to the plate spring 9b. The lift of the lock lever 8 releases the stopper 8c from the spring plate 9b. So, the operator, while lifting up the grip 8d, swings the lock lever 8 to accommodate the swinging bar 8b in the guide piece 10, then takes the grip 8d down. The protrusion 8b of the lock lever 8 is engaged to the crow 10c of the block 10a to lock the lock lever 8 to the guide piece 10.

The above-mentioned operations can be executing by using only the lever, which makes the operations easier.

With reference to FIG. 3, the inner optical fiber cables 7 are moved and flickered by the swing of the lock levers 8 connected to the optical adapters 1. The flicker of the inner optical fiber cables 7 may damage the inner optical fiber cables 7 through contact with other components provided in the optical circuit assembly.

A fiber holder 14, rectangular plates 15, 16, and 17 are provided on the mother board 2a to guide the inner optical fiber cables 7, preventing the inner optical fiber cables 7 from being applied with a mechanical force by a contact with other components. As shown in FIG. 10, the inner optical fiber cables 7, which are connected between the optical modules 3 and the optical adapters 1, are supported by the fiber holder 14, and the plates 15, 16, and 17. The fiber holder 14 clamps the inner optical fiber cables 7, and thereby the first portion of the inner optical fiber cables 7 between the optical modules 3 and the fiber holder 14 stands still without moving when the lock levers 8 are swung.

Figure 11A:
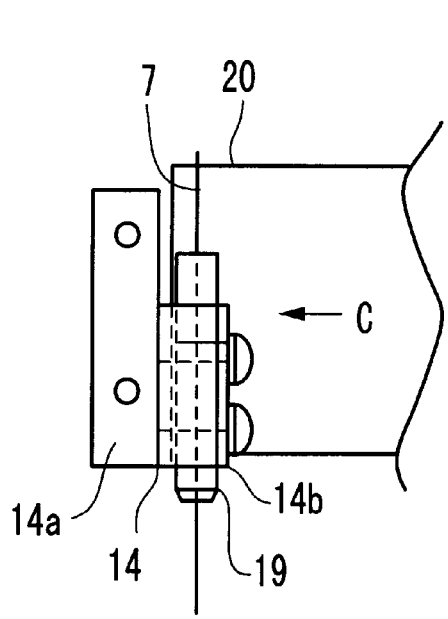
FIGS. 11A and 11B show the fiber holder 14 in detail.
Figure 11B:
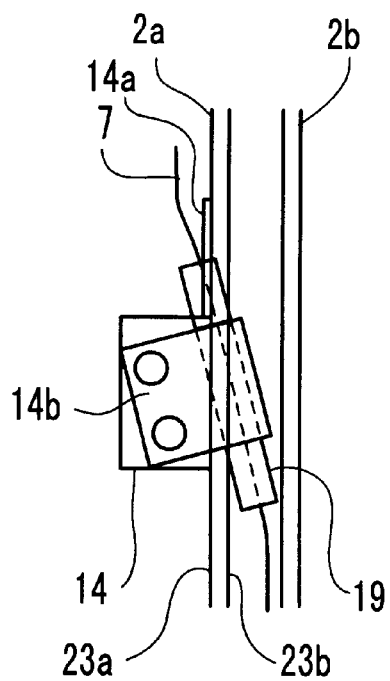

FIG. 11A shows a front view of the fiber holder 14 viewed from direction vertical to the mother board 2a, and FIG. 11B shows a side view of the fiber holder 14 viewed from a direction of the arrow C in FIG. 11A.

The fiber holder 14 includes a holder body 14a and a clamp 14b. The holder body 14a is fixed on the mother board 2a. The clamp 14b is coupled to the holder body 14b and clamps the inner optical fiber cables 7. Each of the inner optical fiber cables 7 are wrapped by a silicone tube 19 in the clamped portion thereof. A spiral notch is made in the silicon tube 19. The soft silicone tube 19b protects the optical fiber cable 7. Also, the silicone tube 19 increases the curvature radius of the optical fiber 7, which is introduced between the surface 23a on which the rotating mechanisms 50 are provided and the surface 23b facing the daughter board 2b.

The second portion of the inner optical fiber cables 7 between the fiber holder 14 and the optical adapters 1 moves in response to the swing of the lock levers 8. The plates 15, 16, and 17 guide the second portion for avoiding the damage thereof.

Figure 12:
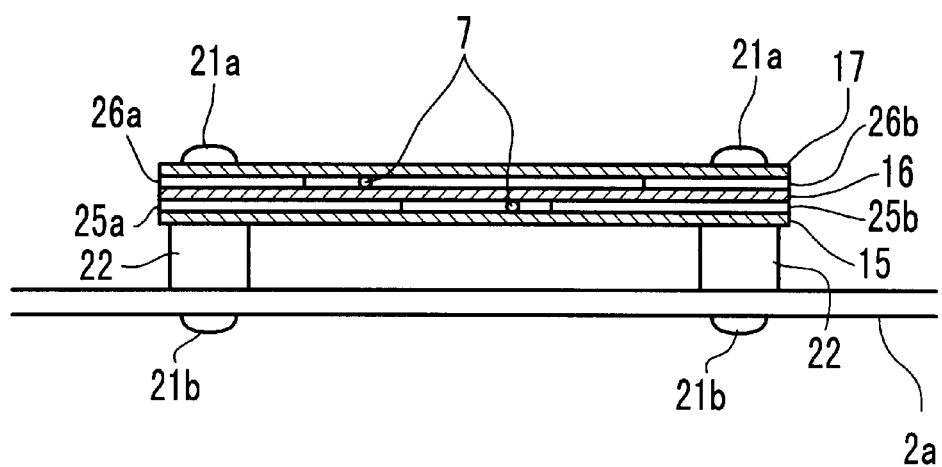
FIG. 12 shows the plates 15, 16, and 17.

FIG. 12 shows the plates 15, 16, and 17. Gaps are respectively provided between the plate 15 and the plate 16 and between the plate 16 and the plate 17. As shown in FIG. 3, the inner optical fiber cables 7 are introduced across the edge 24a and 24b and passed through the gaps to be guided in the same direction when moved by the rotating mechanism 50. The plates 15, 16 and 17 have screw holes (not shown) in the corners 27a, 27b, 27c and 27d. As shown in FIG. 12, supporters 22 are placed on the mother board 2a, and the plates 15, 16 and 17 and the supporters 22 are screwed to the mother board 2a by screws 21a, the supporters 22 being inserted between the plate 15 and the mother board 2a.

Shims 25a to 25d and 26a to 26d are provided for regulating the movement route of the inner optical fiber cables 7. As shown in FIG. 12, the shims 25a, 25b, 25c and 25d are inserted between the plate 15 and 16. The shims 26a, 26b, 26c and 26d are inserted between the plate 16 and 17. The shims 25a to 25d and 26a to 26d are screwed to the mother board 2a and the plates 15, 16 and 17 by the above-mentioned screws 21a. The shims 25a to 25d and 26a to 26d prevent the inner optical fiber cables 7 from being contacted with the screws 21a. As shown in FIG. 3, the shims 25a to 25d and 26a to 26d are sectoral, and the sectoral shape of them increases a curvature radius of the inner optical fiber cables 7.

The shim 25a is located in the corner 27a, which is formed between the edges 24a and 24b. The shim 25b is located in the corner 27b, which is formed on the other end of the edge 24b. The shim 25c is located in the corner 27c, which is formed on the other end of the edge 24a. The shim 25d is located in the remaining corner 27d of the plate 15. The radiuses of the shims 25a and 25b are larger than those of the shims 25c and 25d.

The shims 26a, 26b, 26c, and 26d are respectively located in the corner 27a, 27b, 27c, 27d.

Figure 13:
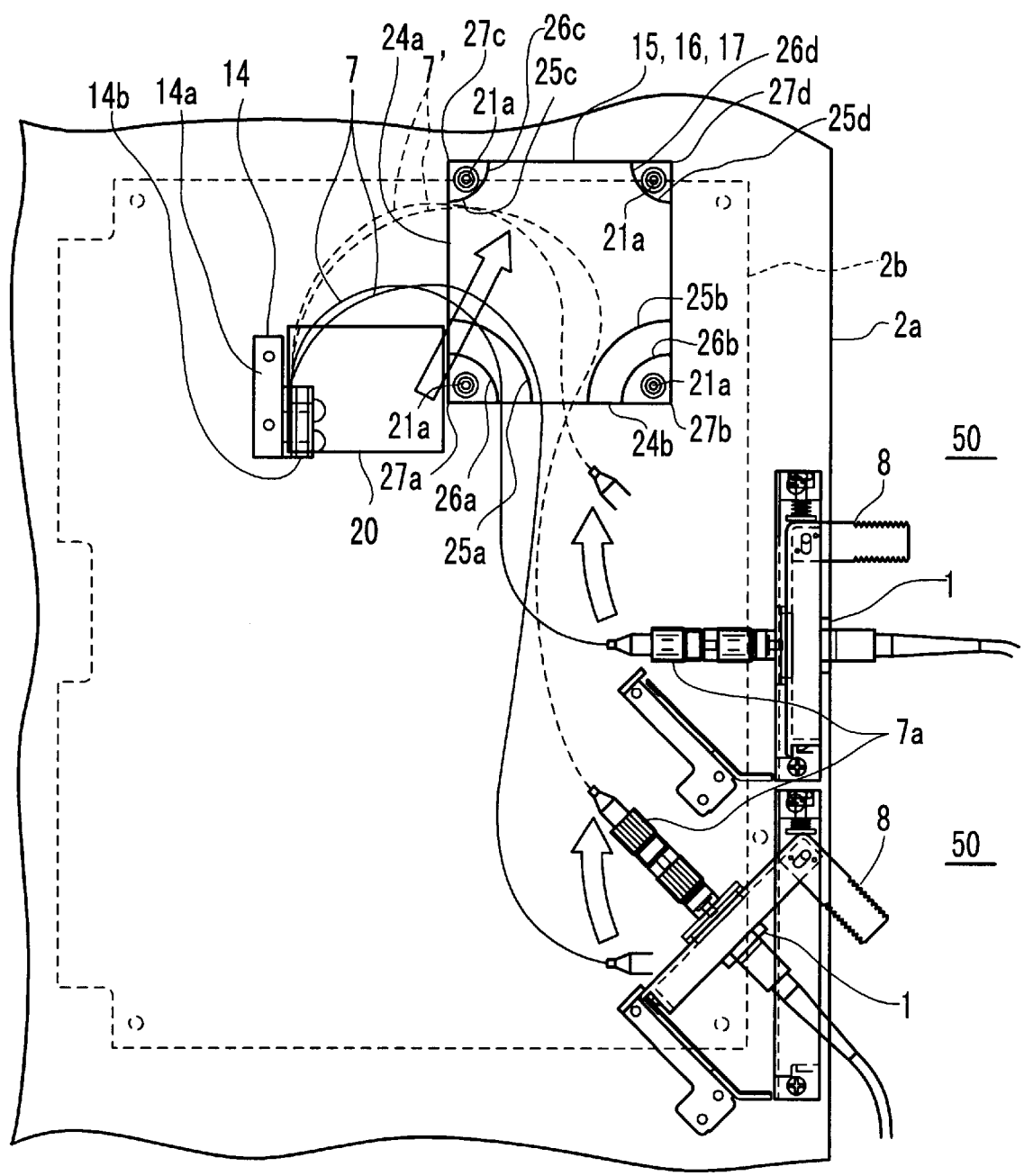
FIG. 13 shows the movement of inner optical fiber cables 7 in response to the rotation of lock lever 8.

FIG. 13 shows the movement of the inner optical fiber cables 7 when the lock lever 8 is swung to withdraw the optical adapters 1 and the optical fiber cables 4. The plates 15, 16 and 17 guide the inner optical fiber cables 7 in the same direction when the inner optical fiber cables 7 are moved by the rotating mechanisms 50. Each of the inner optical fiber cables 7 are guided by the plates 15, 16 and 17 to move substantially in a plane parallel to the plates 15, 16, and 17. Also, the plates 15, 16 and 17 suppress the suspension of the inner optical fiber cables 7, and protect the interference with the components on the mother board 3. This suppresses the load applied to the inner optical fiber cables 7 and prevents the inner optical fiber cables 7 from being damaged.

In the first embodiment, the optical adapter 1 is rotated and fixed above the mother board 2a, and the protrusion of the optical fiber cables 4 from the edge of the mother board 2a is reduced when the optical circuit assembly is in service.

In addition, the flicker of the inner optical fiber cables 7 during the shipment or the service is suppressed by the fiber holder 14 and the plates 15, 16, and 17.

Furthermore, the rotating mechanisms 50 facilitate the connection and disconnection of the optical adapters 1 and the optical fiber cables 4.

Second Embodiment

Figure 14:
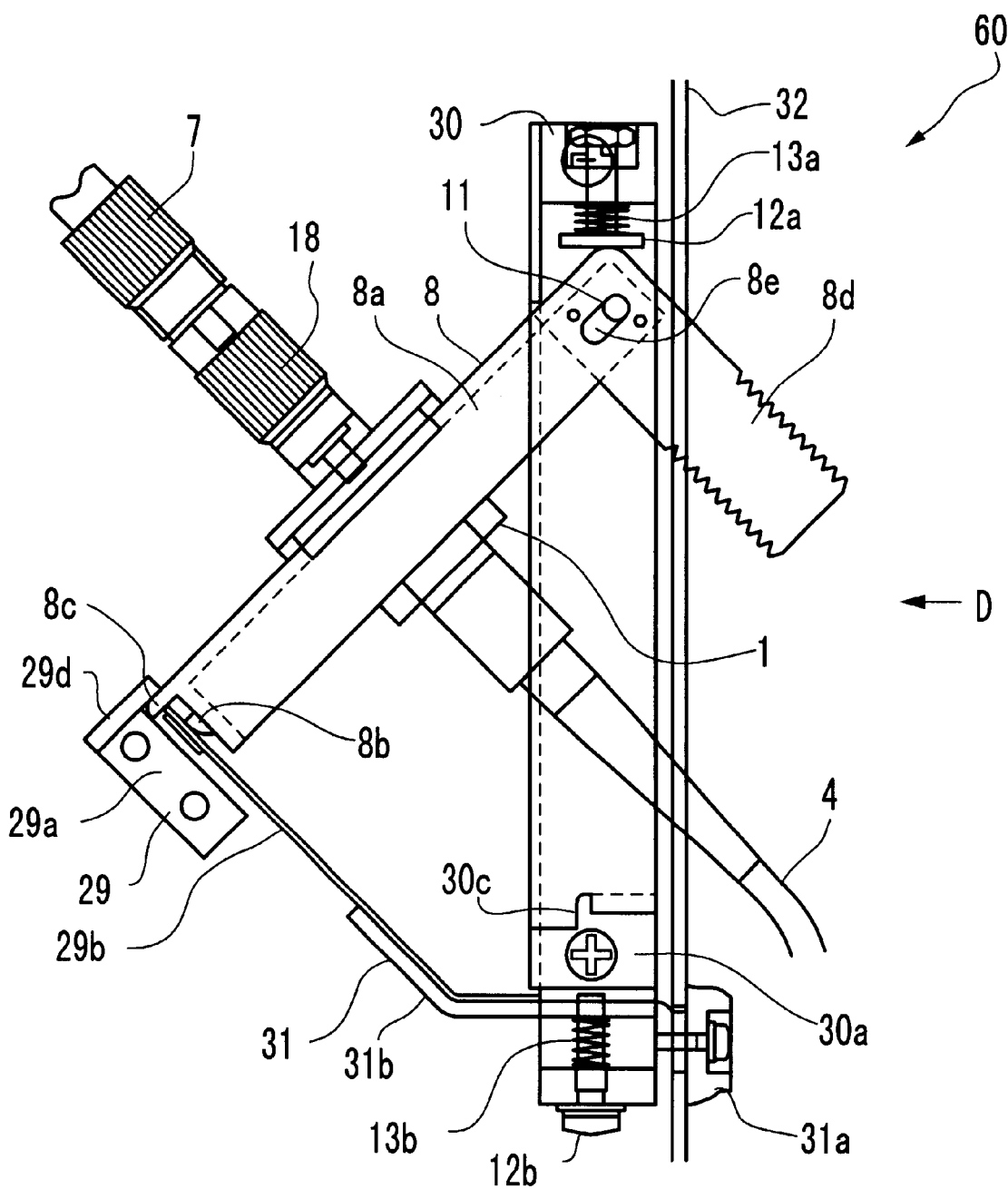
FIG. 14 shows a rotating mechanism 60 in a second embodiment.

In the second embodiment, the rotating mechanisms 50 in the first embodiment are replaced by rotating mechanisms 60 shown in FIG. 14. Except for the rotating mechanisms 60, the configuration of the optical circuit assembly in the second embodiment is identical to that in the first embodiment.

In the rotational mechanism 60, the guide piece 10 and the lock plate 9 in the rotational mechanism 50 are respectively replaced by a lock piece 29 and a guide piece 30. In addition, a hook lever 31 and a package front plate 32 are attached in front of the guide piece 30.

Figure 15:
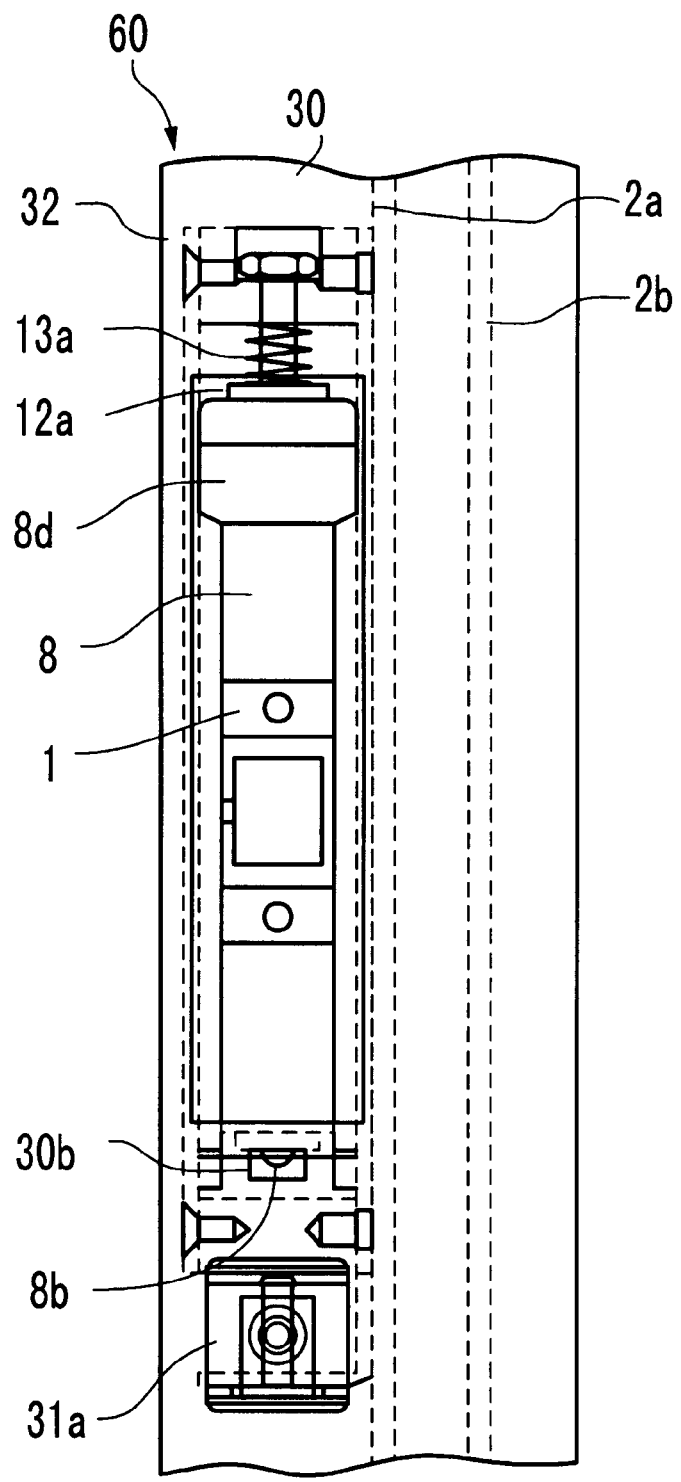
FIG. 15 shows the rotating mechanism 60.

As shown in FIG. 15, the swinging bar 8a is accommodated in the guide piece 30 when swung to the edge of the mother board 2a. As shown in FIG. 14, the guide piece 30 includes a block 30a, a shaft 12, and a coil spring 13. A crow 30c is provided on the block 30a to be engaged to the protrusion 8b and the stopper 8c to lock the lock lever 8. The coil spring 13 pushes the lock lever 8 by the shaft 12. The spring pin 11, which rotatably supports the lock lever 8, is connected to the upper portion of the guide piece 30.

The lock plate 29 is composed of a plate body 29a disposed at an angle of 45 degrees to the guide piece 30, a plate spring 29b in parallel along the plate body 29a, and a hook lever 31. The plate body 29a is screwed to the mother board 2a. The plate body 29a has a wall 29d on the tip thereof. The plate spring 29b and the wall 29d are engaged to the swinging bar 8a on the stopper 8c such that the swinging bar 8a is locked at an angle of 45 degrees to the guide piece 30.

The hook lever 31 is composed of a lever 31a, a hook lever body 31b, a shaft 12b, and a coil spring 13b. The lever 31a is disposed in front of the package front plate 32, and located substantially at the edge of the mother board 2a. The lever 31a is allowed to slide on the package front plate 32 in the vertical direction. The hook lever body 31b is connected between the lever 31a and the plate spring 29b. The hook lever body 31b and the plate spring 29b are shifted in response to the slide of the lever 31a. The hook lever body 31b is coupled to the shaft 12b. The shaft 12b penetrates the guide piece 30, and supported by the coil spring 13b. The coil spring pushes the hook lever body 31b by the shaft 12b.

When the lock lever 8 is accommodated in the guide piece 30, the protrusion 8b is engaged to the crow 30c to lock the lock lever 8. When engaged to the crow 30c, the lock lever 8 is downwardly pushed by the coil spring 13a so that the lock of the lock lever 8 is not released.

When the lock lever 8 is kept at the angle of 45 degrees to the guide piece 10, the stopper 8c is engaged to the wall 29d and the plate spring 29b. The wall 29d, if the lock lever 8 is reclined at an angle of 45 degrees or more, collides with the stopper 8c to accordingly stop the rotation.

A slide of the lever 31a by an operator releases the lock of the lock lever 8 from the lock plate 29. When the lock lever 8 is locked by the lock plate 29, the coil spring 13a pushes the lock lever 8 toward the lock plate 29 to keep the lock of the lock lever 8. The downward slide of the lever 31a detaches the plate spring 29b from the lock lever 8 to release the lock of the lock lever 8. Then the lock lever 8 is allowed to swing.

The operator swings the lock lover 8 by the grip 8d to accommodate the swinging bar 8a in the guide piece 30. The downward shift of the grip 8d by the operator engages the lock lever 8 and the guide piece 30 to lock the lock lever 8.

In the second embodiment, the hook lever 31 facilitates the release of the lock lever 8 from the lock plate 29.

Third Embodiment

Figure 16:
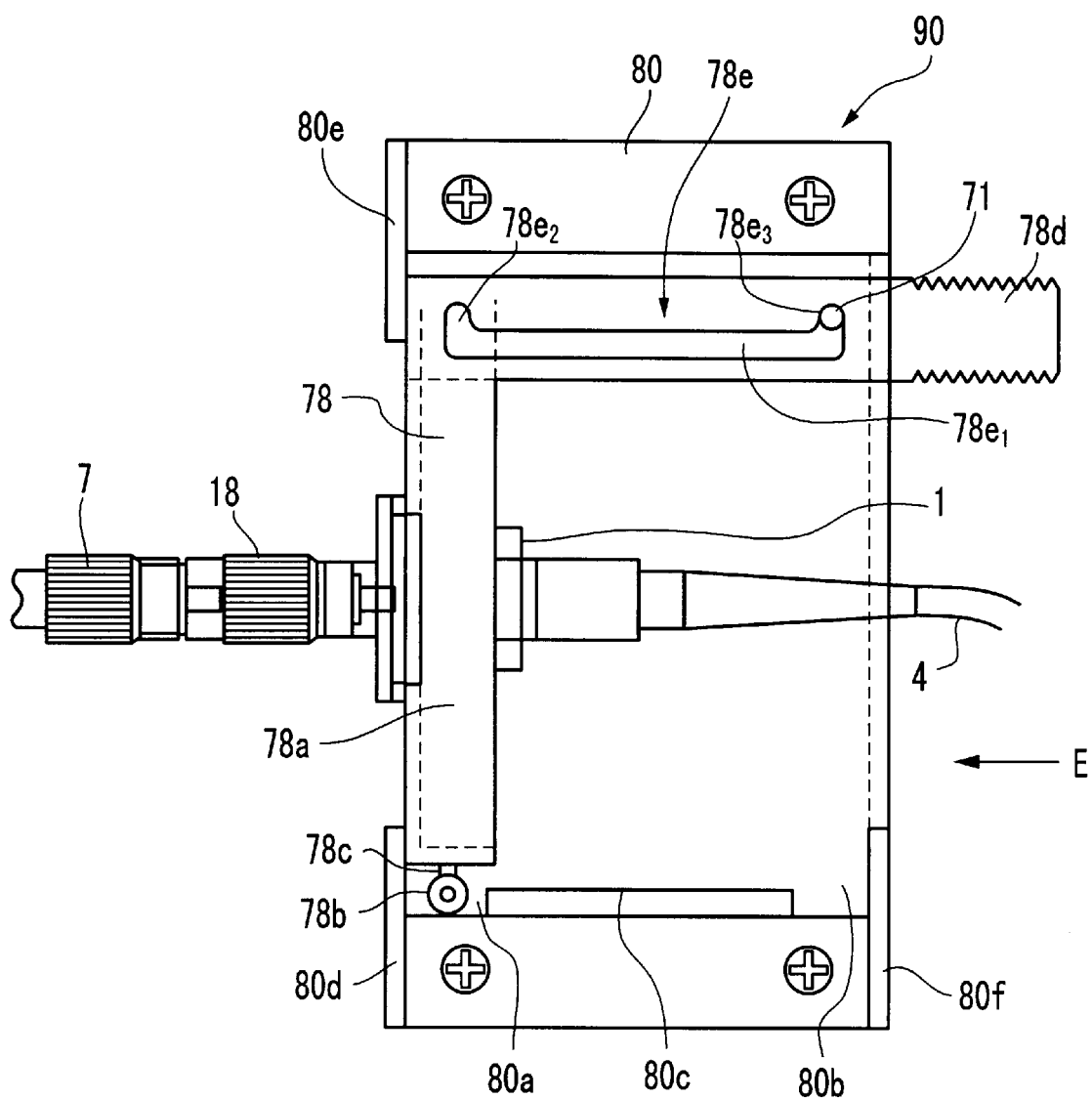
FIG. 16 shows a sliding mechanisms 90 in a third embodiment.

In the third embodiment, the rotating mechanisms 50 in the first embodiment are replaced by sliding mechanisms 90 shown in FIG. 16. Except for the sliding mechanisms 90, the configuration of the optical circuit assembly in the third embodiment is identical to that in the first embodiment.

Figure 17:
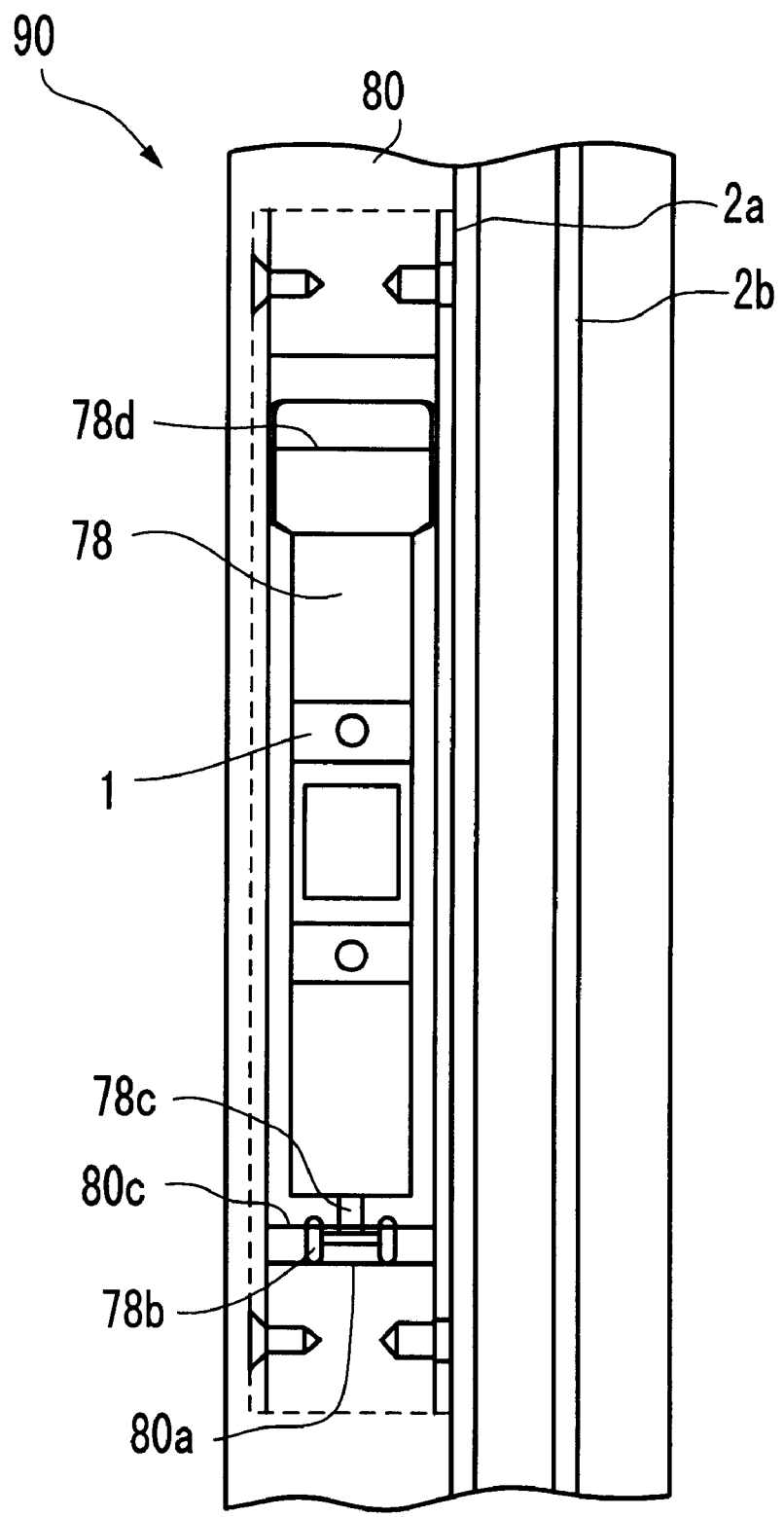
FIG. 17 shows the sliding mechanism 90.

FIG. 16 is a side sectional view showing the sliding mechanisms 90. FIG. 17 is a front view when the sliding mechanism 90 is viewed from a direction of an arrow E.

As shown in FIG. 16, each of the sliding mechanisms 90 includes a lock lever 78 and spring pin 71 and a guide piece 80. The lock lever 78 is coupled to the optical adapter 1, which connects the optical fiber cable 4 and the inner optical fiber cable 7. The attenuator 18 is inserted between the optical adapter 1 and the inner optical fiber cable 7. The spring pin 71 is fixed to the upper portion of the guide piece 80. The lock lever 78 is slidingly coupled to guide piece 80 on the spring pin 71.

The lock lever 78 is composed of a supporter 78a, a wheel 78b, a wheel shaft 78c and a grip 78d. The supporter 78a is coupled to the optical adapter 1. A hole (not shown) is made in the supporter 78a, in order to insert the optical adapter 1 in a direction vertical to the supporter 78a.

The wheel 78b is connected by the wheel shaft 73c to a tip of the supporter 78a. The grip 78d vertically is coupled to the other tip of the supporter 78a. A U-shaped long hole 78e is provided through the grip 78d. The spring pin 71 is inserted through the U-shaped long hole 78e. The U-shaped long hole 78e includes a sliding portion $78e_1$, locking portions $78e_2$ and $78e_3$. The sliding portion $78e_1$ extends in the direction parallel to the extension direction of the grip 78d. The locking portions $78e_2$ and $78e_3$ are provided at the both ends of the sliding portion $78e_1$, and extend in the direction orthogonal to the sliding portion $78e_1$. The locking portions $78e_2$ and $78e_3$ have a length longer than the radius of the wheel 78b.

The grip 78d is handled by an operator to slide the lock lever 78. A slit is made in the grip 78d for an easy pinch of the grip 78d.

As shown in FIG. 17, The lock lever 78 is accommodated in the guide piece 80. The guide piece 80 is composed of a plate 80c, walls 80d, 80e and 80f. The plate 80c horizontally guides the lock lever 78. The walls 80d, 80e and 80f stop the horizontal movement of the lock lever 78. A groove 80a disposed between the wall 80d and the plate 80c; and a groove 80b disposed between the wall 80f and the plate 80c. The grooves 80a and 80b accommodate the wheel 78b to lock the lock lever 78.

When the optical circuit assembly is in service, the optical adapters 1 and the optical fiber cables 4 are withdrawn to the inside of the mother board 2a. To withdraw the optical adapters 1 and the optical fiber cables 4, the lock lever 78 is pushed away from the edge of the mother board 2a. In detail, the operator lifts up the grip 8d along the locking portion 78e₃ to release the lock of the lock lever 78 from the groove 80b. The lock lever 78 is allowed to slide in the horizontal direction. Next, the operator pushes and slides the lock lever 78 by the grip 78d. During the slide of the lock lever 78, the wheel 78b is rolled on the plate 80c to guide the lock lever 78 in the horizontal direction. Then, the wheel 78b drops onto the groove 80a from the plate 80c, and collides with the walls 80d, 80e to lock the lock lever 78. The walls 80d, 80e protect the lock lever 78 from being excessively moved in the horizontal direction.

To connect or disconnect the optical fiber cable 4 to the optical adapter 1, The optical adapter 1 is drawn to the edge of the mother board 2a. To draw the optical adapter 1, the lock lever 78 is pulled to the edge of the mother board 2a. In detail, the operator lifts up the grip 8d along the locking portion 78e₂ to release the lock of the lock lever 78 from the groove 80a. The lock lever 78 is allowed to slide in the horizontal direction. Next, the operator pulls and slides the lock lever 78 by the grip 78d. During the slide of the lock lever 78, the wheel 78b is rolled on the plate 80c to guide the lock lever 78 in the horizontal direction. Then, the wheel 78b drops onto the groove 80b from the plate 80c, and collides with the walls 80f to lock the lock lever 78. The wall 80f protects the lock lever 78 from being excessively moved in the horizontal direction.

As mentioned above the sliding mechanisms 90 facilitate the connection and disconnection of the optical adapters 1 and the optical fiber cables 4.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical circuit assembly comprising:
   a board for mounting an optical circuit element;
   an optical adapter which connects an optical fiber cable to said optical circuit element; and
   an adapter supporting member which movably supports said optical adapter, and
   wherein said adapter supporting member allows said optical adapter to move between first and second positions,
   said first position is located substantially at an edge of said board, and
   said second position is located above said board away from said edge.

2. The optical circuit assembly according to claim 1, wherein said adapter supporting member includes a grip for handling by an operator to move said optical adapter.

3. The optical circuit assembly according to claim 1, wherein said adapter supporting member includes a first fixing member which locks said optical adapter to said first position.

4. The optical circuit assembly according to claim 3, wherein said adapter supporting member further includes a grip for handling by an operator to move said optical adapter, and
   said first fixing member releases said optical adapter from said first position by said handling.

5. The optical circuit assembly according to claim 1, wherein said adapter supporting member includes a second fixing member which locks said optical adapter to said second position.

6. The optical circuit assembly according to claim 5, wherein said adapter supporting member further includes a grip for handling by an operator to move said optical adapter, and
   said second fixing member releases said optical adapter from said second position by said handling.

7. The optical circuit assembly according to claim 5, wherein said adapter supporting member further includes a sliding piece, and
   said second fixing member releases said optical adapter from said second position in response to sliding of said sliding piece.

8. The optical circuit assembly according to claim 7, wherein said sliding piece is located substantially at said edge.

9. The optical circuit assembly according to claim 1, wherein said adapter supporting member includes:
   a swinging bar coupled to said optical adapter,
   an axis which is connected to one of ends of said swinging bar to allow said supporting bar to swing on said axis.

10. The optical circuit assembly according to claim 1, wherein said adapter supporting member includes:
    an adapter carrier coupled to said optical adapter;
    an adapter guide member slidingly connected to said adapter carrier to guide said adapter carrier such that said optical adapter moves between said first and second positions.

11. The optical circuit assembly according to claim 1, further comprising an optical fiber guide member connected on said board, wherein said optical circuit element includes an inner optical fiber cable coupled to said optical adapter, and
    said optical fiber guide member guides said inner optical fiber cable to move substantially in an plane.

12. The optical circuit assembly according to claim 1, wherein said optical fiber guide member comprises first and second planar boards, and
    said inner optical fiber cable passed between said first and second planar boards.

13. The optical circuit assembly according to claim 1, further comprising a fiber supporting member connected on said board, wherein said optical circuit element includes:
    an optical device, and
    an inner optical fiber cable connected between said optical device and said optical adapter, and
    said adapter supporting member is provided on a first side of said board, and said optical device is provided on a second side of said board opposite to said first side, and
    said board is provided with a hole between said first and second side, and
    said fiber supporting member supports said inner optical fiber cable such that said inner optical fiber cable passes through said hole.

14. The optical circuit assembly according to claim 13, wherein said fiber supporting member comprises a tube surrounding said inner optical fiber cable to protect said inner optical fiber cable.

15. The optical circuit assembly according to claim 13, wherein said fiber supporting member supports said inner optical fiber cable such that a first portion of said inner optical fiber cable located on said first side moves by a movement of said optical adapter while a second portion of said inner optical fiber cable located on said second side stays substantially in the same place.

* * * * *